United States Patent Office 2,931,176
Patented Apr. 5, 1960

2,931,176

CONTROL MEANS FOR HYDROSTATIC POWER TRANSMISSION

Peter Bloch, Rockford, Ill., and Hans Haffner, Balsthal, Switzerland, assignors to Ludwig von Roll'schen Eisenwerke A.G., Gerlafingen, Switzerland Application July 23, 1957, Serial No. 673,679

Claims priority, application Switzerland July 23, 1956

9 Claims. (Cl. 60—52)

The present invention relates to hydraulically operated control means and more particularly to control means of the aforesaid type adapted for use in connection with hydrostatic power transmission systems.

In conventional hydrostatic power transmissions or drives provided with primary and secondary units a reversing of the secondary unit between said primary and secondary units may be achieved by control slide means; if such control means are not employed then at least one or the other of the aforesaid units is itself constructed for reversibility. While reversing movement of said units by means of a reversing slide valve has been accomplished with satisfactory results in hydrostatic transmissions of relatively low output, transmissions of relatively high output necessitate, however, a large and heavy reversing slide valve. In order to actuate such a large slide valve, pilot control mechanism had to be provided in most of such latter cases.

A relatively effective solution for the control of high output power transmission is the use of vane type displacement units which may not only be regulated but are also reversible, thus avoiding the need for a reversing slide valve. However, the use of reversible units presents new problems as regards control and regulation thereof in that for both directions of transmission independent control and regulating devices must be provided. The automatic actuation of the regulating means, which normally is effected by the operating pressure of the transmission fluid presents particular difficulties, since the pressure side in the hydraulic circuitry when reversing, for instance, the primary member or unit of the power transmission, is being correspondingly changed or reversed.

It is therefore an object of the present invention to provide means affording efficacious control and regulation of a hydraulic transmission system in a simple and reliable manner.

It is a further object of the present invention to provide means conducive to control and regulation of a reversible hydraulic transmission system by a single regulating device effective for both transmission directions.

Another object of the present invention is the provision of means redounding to safe control of a hydraulic transmission system in a predetermined fashion as a function of the pressure of the hydraulic medium employed.

A further object of the present invention is to provide means ensuring highly economical operation of a reversible hydrostatic power transmission system which may be selectively associated with one or the other of two pressure sides and with one or the other portion of the regulating range of the aforesaid transmission.

A still further object of the present invention is the provision of control means for a reversible hydrostatic power transmission, which is adapted to be automatically associated with a predetermined pressure side and regulating range in accordance with the reversal or change in the direction of the transmission.

The above and other objects of the invention will become further apparent from the following detailed description, reference being made to the accompanying drawings, showing preferred embodiments of the invention.

Figure 1:
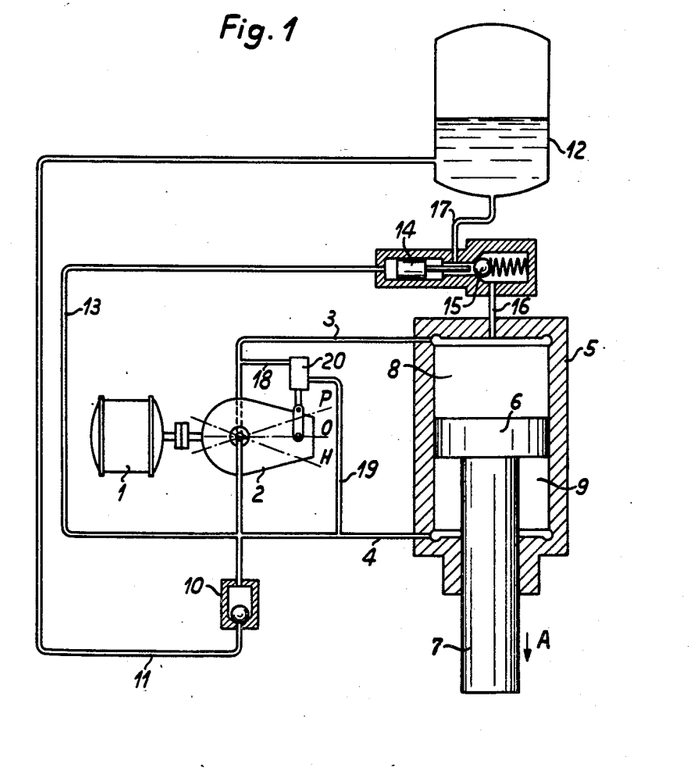
Fig. 1 shows diagrammatically a hydrostatic power transmission system embodying the present invention and employed for the drive of a press.

Referring now more particularly to the hydrostatic power transmission system shown in Fig. 1, control means according to the present invention may be employed in connection with same. Numeral 1 indicates an electric motor operatively and fixedly connected with a primary unit 2 of the hydrostatic power transmission system. The primary unit 2 is constituted in this instance by an axial piston pump which may be of the swash-plate type and which is reversible with respect to its direction of feed. To this end, the primary unit 2 may be pivoted from a position indicated at 0 in which this unit assumes an inoperative position by suitable displacement to respective extreme pivot positions, indicated by P and H. The position P corresponds to an operating position in which a pipe 3 is connected to the high pressure side of the primary unit, while in the position H a pipe 4 is connected to said high pressure side. The pipes 3 and 4 serve to conduct hydraulic fluid from the primary unit to a press and are connected to the upper and lower sides or ends, respectively, of a cylinder 5 of said press. Within said cylinder 5 a press piston 6 having a piston rod 7 is movably arranged, the rod 7 extending through the lower end of the press cylinder 5.

If the primary unit takes up the position P, the chamber 8 of the press cylinder 5 is connected to the high pressure side of the primary unit 2 over pipe 3, so that a hydraulic medium (oil) at high pressure is fed into chamber 8, the piston 6 together with the rod 7 thereby being moved in a downward direction according to arrow A.

Hydraulic fluid (oil) displaced from chamber 9 at the lower side of piston 6 is then conducted back to the primary unit 2 over the pipe 4. Due to the fact that chambers 8 and 9 have different cross-sections, the amount of hydraulic fluid displaced from chamber 9 and flowing through pipe 4 is smaller than the amount fed through pipe 3 into chamber 8. In order to compensate for this difference in volume of hydraulic fluid an additional amount of fluid must be fed into the system. To this end, a one-way valve 10 is connected to pipe 4 which is opened at a predetermined low level of pressure, i.e. if the pressure in the pipe 4 drops below a predetermined value. When this one-way valve 10 is being opened additional hydraulic fluid may flow from a reservoir 12 over a pipe 11 via valve 10 into pipe 4 and thence to the low pressure side of the primary unit 2.

If the primary unit 2 takes up the position indicated at H, hydraulic fluid at high pressure is fed through pipe 4 into chamber 9, thereby lifting piston 6 together with rod 7. Pressure fluid is thereby displaced from chamber 8 and returned through pipe 3 to the primary unit 2. Due to the fact that the amount of fluid displaced from chamber 8 is larger than the amount of fluid fed to chamber 9 in accordance with the difference in cross-section of the two chambers, the pressure in pipe 4 rises above a predetermined value. The aforesaid difference in the cross-section of chambers 8 and 9 is due to the rod 7 extending into chamber 9 thereby reducing the effective cross-sectional area of the latter, and hence, the volume.

This pressure in pipe 4 acts on an auxiliary piston 14 and in a direction to open a biased ball-type valve 15 in the path of piston 14. This valve which, on the one hand, is connected to chamber 8 via a pipe 16 communicates, on the other hand, with the reservoir 12 through a pipe 17. In the open position of valve 15 excess hydraulic fluid displaced from chamber 8 may therefore flow back through pipes 16 and 17 into the reservoir 12 for collection therein.

Pipe lines 18 and 19 lead to a control device 20, which is also connected to pipes 3 and 4, i.e. to the two pressure sides of the primary unit 2, which control device 20 serves to regulate and reverse the primary unit. This control device 20 is described in greater detail in connection with Figs. 2 and 4.

Figure 2:
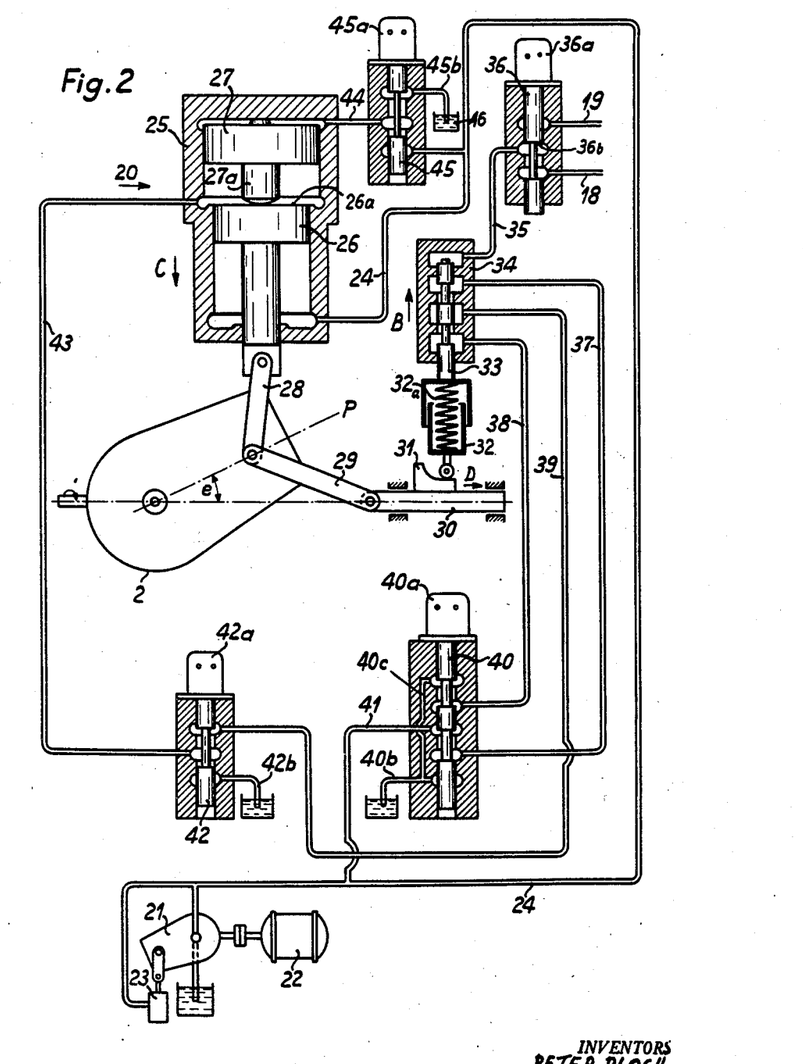
Fig. 2 is a diagram of an indirectly acting hydraulic control device for the power transmission system of a press, shown in Fig. 1, the parts thereof being shown in positions corresponding to the press action of the press piston of Fig. 1.
Figure 3:
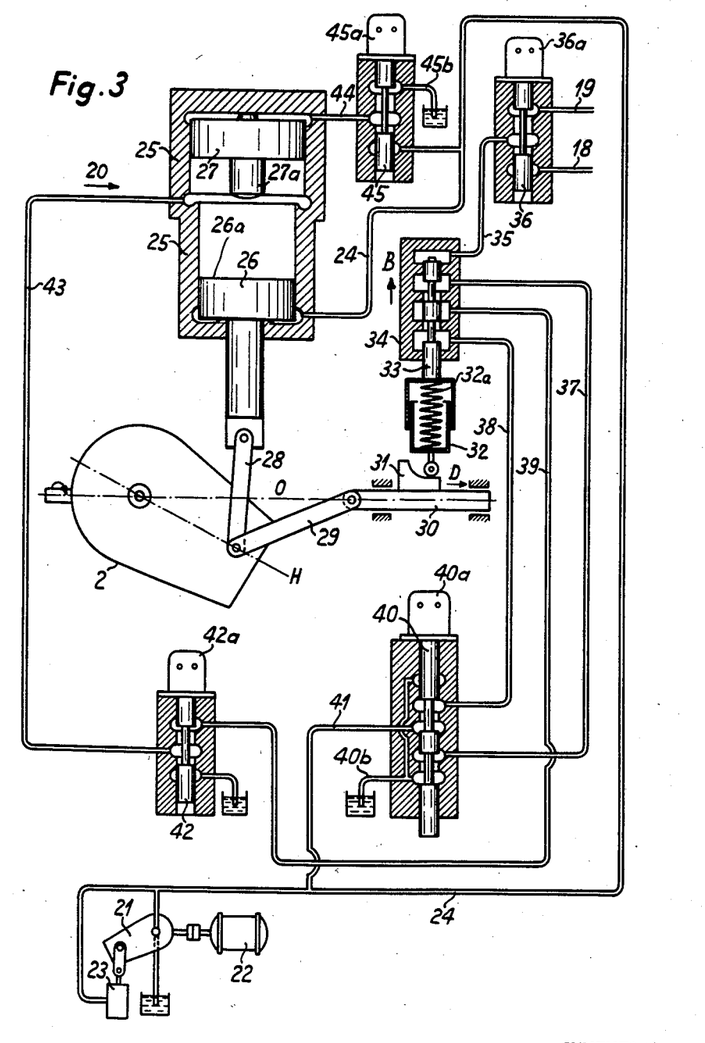
Fig. 3 shows the diagram of Fig. 2 with the parts displaced into positions corresponding to a lifting action of the press piston.
Figures 4, 4A:
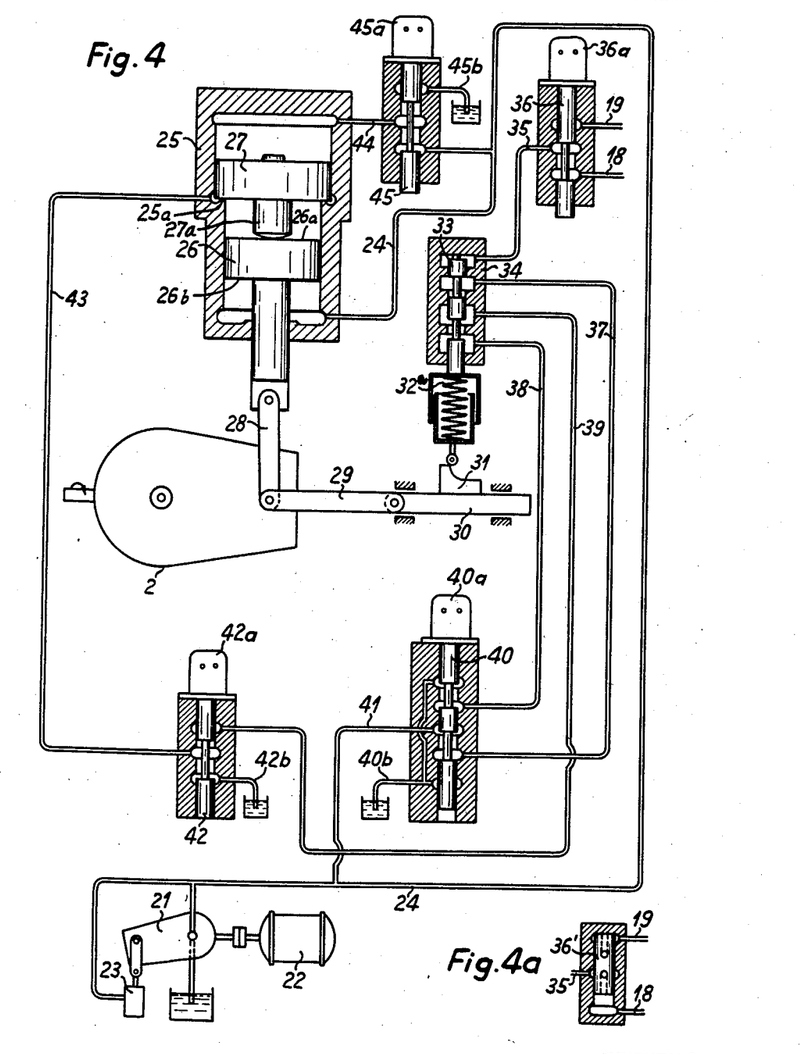
Fig. 4 shows the diagram of Fig. 2 with the parts displaced into positions corresponding to an inoperative position of the press.
Fig. 4a shows a slide valve adapted for automatic coordination of the high pressure side of the transmission to the control device.

Figs. 2 to 4 show the control device 20 of Fig. 1 in three different positions, Fig. 2 indicating the position of the control device for effecting a downward movement of the piston 6, i.e. corresponding to the position P of the primary unit 2.

As shown in Fig. 2, the control device is provided with an auxiliary hydraulic circuit fed from an axial piston pump with a hydraulic fluid, for instance, oil of constant pressure. Instead of using a constant pressure system in connection with this hydraulic circuit it is possible to use a pump of constant displacement or a feed volume combined with an excess oil valve.

In addition, a reservoir subjected to the effect of compressed air may be used. In the embodiment shown in Fig. 2 the axial piston pump 21 driven by electric motor 22 is subjected to the action of a pressure regulating device 23 adapted to control the axial piston pump so as to maintain a constant pressure in the auxiliary system. To this end, the pressure regulating device 23 is connected to the pressure side of the axial piston pump 21. A pipe 24 connects this pressure side also to a servo-motor 25 having an operating piston 26 and an auxiliary piston 27. The operating piston, the lower side of which is continually subjected to the pressure of the auxiliary hydraulic system, i.e. to the pressure of the oil fed through a pipe 24, is connected via a piston rod 28 with the primary unit 2, so that a displacement of this piston 26 will effect a corresponding pivoting movement of the primary unit. A connecting rod 29 operatively connects in turn the primary unit 2 with a cam slide 30 carrying a cam 31. Cam 31 supports one end of a member 32 under action of spring 32a, the other end of said spring 32a acting upon a slide valve 33 of a regulating member 34. The spring 32a is thereby biased to move the slide valve 33 in an upward direction according to arrow B.

The upper end of slide valve 33 is in communication with a slide valve 36 via a pipe 35, which slide valve is adapted to subject the upper end of slide valve 33 to the action of the high pressure side of the primary unit 2, namely, to the pressure of the hydraulic fluid fed through pipe 18 which is connected with the housing of slide valve 36. The pressure at the under side 36b of slide valve 36 is therefore the same as the pressure in pipe 3 or the pressure acting upon the upper side of the brass piston 6 shown in Fig. 1, whereby the slide valve 33 may be displaced in accordance with this pressure. Connected to the regulating member 34 are pipes 37, 38 and 39. Pipes 37 and 38 are in turn in communication with a slide valve 40 adapted to control the regulating range of the servo-motor 25. Slide valve 40 is also in communication by means of branch pipe 41 to pipe 24. Pipe 39 connects regulating member 34 via a control slide 42 and pipe 43 with the upper side of the operating piston 26 and concurrently with the lower side of the auxiliary piston 27. The upper side of the auxiliary piston 27 is in turn in communication with a further control valve 45 via a pipe 44, the control slide 45 being adapted to associate the upper side of the auxiliary piston 27 with pipe 24.

Each of the slide valves 36, 40, 42 and 45 is provided with an electric actuating member 36a, 40a, 42a and 45a, these actuating members being electrically connected with each other (not shown), so that the operation of the actuating members 36a and 40a and 42a and 45a, respectively, is effected simultaneously, to thereby displace the corresponding slide valves.

From Fig. 2 it will be understood that primary unit or member 2 will take up its extreme position P if the lower side of the operating piston 26 is subjected to the pressure of oil fed through pipe 24, whereby this operating piston 26 abuts with its upper end against the downwardly extending rod projection 27a of the auxiliary piston 27. The auxiliary piston 27 is hence displaced to its upper end position. Any feed of pressure oil from pipe 24 to the upper side of the auxiliary piston 27 is interrupted by slide valve 45, which assumes its upper end position and connects pipe 44 with drain pipe 45b so that any fluid (oil) on the upper side of piston 27 may be collected in a suitable container or sump 46. The slide valve 45 and slide valve 42 are electrically coupled through actuating members 45a, 42a, respectively, whereby slide valve 42 is displaced to assume the position shown in Fig. 2, whereby servo-motor 25 is in communication with regulating member 34 via pipes 43 and 39. The purpose of slide valves 42 and 45 will be described in greater detail in connection with Fig. 4.

The two slide valves 36 and 40 act as coordination valves, i.e., valve 40 acts to coordinate the predetermined pressure side of the axial piston pump 21 to the regulating member 34, and valve 36 acts to coordinate the change or adjustment of the pressure of the primary unit 2 to the regulating member 34. In the present case, the pivot range from 0 to P positions corresponds to a movement from its inoperative position to +MAX of the total range of adjustment of the primary unit, whereas the pivotal movement from H to P corresponds to the range of adjustment from −MAX to +MAX. As mentioned before, slide valve 36 connects pipe 18 with pipe 35, which leads to the upper end of slide valve 33. Slide valve 40 establishes connection of pipe 41 with pipe 24 and with pipe 37, while pipe 38 communicates with drain pipe 40b via duct 40c.

When the pressure at the upper side of slide valve 33 and bias action spring 32a at the lower side of this slide valve are balanced in the position shown in Fig. 2, the connection between pipes 37 and 39 remains interrupted so that the servo-motor 25 is not actuated. Thus, the position of the primary unit 2 remains unchanged. If, however, the pressure acting at the upper side of slide valve 33 increases the latter is displaced downwardly (contrary to arrow B) against the bias or action of spring 32a, thus establishing communication between pipes 37 and 39, whereby the upper side of operating piston 26 is subjected to the pressure of the auxiliary oil in pipe 24 via slide valve 42 and pipe 43.

Since the effective cross-sectional area of the upper side of piston 26 is larger than the one at the lower side of this piston, the latter will be displaced in a downward direction due to the greater force which acts on the upper side 26a of piston, in the direction of arrow C, thereby pivoting the primary unit towards 0-position, so that the displacement or feed volume of the primary unit is reduced in order to compensate for the increased pressure and to maintain this unit at a constant output. Due to the displacement of the primary unit 2 through its pivoting movement, cam 31 is displaced in a direction D, to thereby increase the bias action of spring 32a whereby the latter, in turn, displaces the slide valve 33 by an amount to restore a condition of balance between the action of the spring and the pressure of the hydraulic fluid. This will be effected when the slide valve 33 has again reached the position shown in Fig. 2, in which pipes 37 and 39 do not communicate with each other, as hereinabove set forth.

If at a later stage the pressure in pipes 3 and 18 is decreased the balance of the forces acting upon slide valve 33 is disturbed, so that this slide valve will be moved upwardly (arrow B) under the effect of the increased bias action of spring 32a, thereby pipes 39 and 38 are in communication with each other, pipe 38 being connected via slide valve 40 with its drain 40b. Therefore, the pressure at the upper side 26a of operating piston 26 may decrease, since the oil may flow from the servo-motor through pipes 43, 39 and 38 to the aforementioned drain.

In view of the fact that the pressure at the lower side of the operating piston remains constant, the latter is displaced in an upward direction (contrary to arrow C) and thereby pivots the primary unit 2 towards the position P, while simultaneously displacing cam 31 to reduce the bias action of spring 32a so that the slide valve 33 will return into its position of equilibrium. Due to this operation it is ensured that the power output at the shaft of primary unit 2 remains constant. In other words, the product of the pressure and the pivoting angle (angular position) remain constant in order to prevent excess load at the drive motor. To this end cam 31 is given a substantially hyperbolic shape in order to reproduce the function $$P = \frac{K}{\theta}$$

in which equation P designates pressure, K is a constant and $\theta$ is the pivoting angle of the primary unit 2.

The portion of slide valve 33 communicating with pipe 35 may have a smaller diameter than the remaining part or portion of the valve in order to permit operation with a relatively small spring 32a on the one hand, and to permit sufficiently large cross-sections for the pipes controlled by the slide valve, on the other hand.

In the position of the members shown in Fig. 3 primary unit 2 assumes its lifting position H, in which consequently pipe 4 of the hydrostatic transmission system is connected to the high pressure side of this primary unit 2, so that the pressure of the hydraulic fluid fed through pipe 19 is transmitted to slide valve 36. Therefore, slide valve 36 ensures that regulating member 34 will be in communication with pipe 19 by means of pipe 35; pipe 19 being connected with pipe 4 (Fig. 1). The position of slide 40 corresponds to the position of slide 36 due to the fact that these two slides are electrically coupled by means of elements 40a, 36a, respectively, so that oil from the auxiliary circuit flows from pipe 24 to slide valve 33 via slide valve 40 and pipe 38, whereas pipe 37 is connected with the drain 40b by means of slide valve 40. In the position shown, slide valve 33 interrupts the flow of the hydraulic medium between pipes 38 and 39, the latter being connected with pipe 43 via slide valve 42. Due to the pressure which acts on the upper side 26a of piston 26 of servo-motor 25 this piston is maintained in its lower end position, the position of the remaining parts corresponding to that shown in Fig. 2.

Upon increase of pressure in pipe 19 slide valve 33 is displaced downwardly thereby connecting pipes 39 and 37 with each other and permitting a drain of oil from the upper side of piston 26; the latter will therefore move upwardly under the pressure of oil in pipe 24, whereby the primary unit 2 is displaced toward its 0-position, thus reducing the rate of displacement of this unit.

Simultaneously cam 31 is displaced in the direction of arrow D to increase the bias action of spring 32a; the system regaining its equilibrium when the bias of spring 32a is sufficient to displace slide valve 33 against the increased operating pressure of the hydraulic medium in pipe 19 upwardly to its initial position, whereby the connection between pipes 37 and 39 is interrupted. Due to the aforementioned characteristic or shape of cam 31 this equilibrium will be restored, so that the product of the pressure and the rate of feed or displacement of the hydraulic medium (which corresponds to the angular position of the primary unit) again assume the initial value, i.e. when the power will again be constant.

When the pressure decreases in the above described position of primary unit 2, the slide valve 33 will be displaced upwardly due to the action of spring 32a, thereby opening the connection between pipes 38 and 39. The pressure of oil in the auxiliary system is effective at the upper side of piston 26 and displaces the latter downwardly, thereby pivoting primary unit 2 towards position H. The corresponding displacement of cam 31 (contrary to arrow D) results in a reduction of the biasing action of spring 32a due to which the slide valve 33 will return to its initial position.

In Fig. 4 the position of the parts of the transmission system in the inoperative position of the press, i.e., in the idling position of the press drive is shown. In this position primary unit 2 assumes the aforementioned 0-position. The 0-position may be reached, for instance, by operating or displacing slide valve 45 together with slide valve 42 in a downwardly direction, whereby, on the one hand, the pressure from pipe 24 will act upon the upper side of the auxiliary piston 27 via pipe 44, while, on the other hand, pipe 43 is connected to drain 42b, so that oil between pistons 26 and 27 may be drained from servo-motor 25. The auxiliary piston 27 is thereby moved to its lower end position which is defined by stop shoulder 25a of the casing of servo-motor 25. In this end position projection 27a of auxiliary piston extends into the path of movement of the piston 26, the latter abuts against this projection 27a when displaced towards its central position due to the pressure of the oil acting on its lower side 26b via pipe 24. The central position of piston 26 corresponds to the 0-position of the primary unit 2, in which the latter does not displace or feed any hydraulic medium. Cam 31 connected to primary unit 2 has reached the position in which the bias of spring 32a assumes its maximum value, whereby slide valve 33 is displaced to its upper end position against the pressure in pipe 18, which is associated with the regulating member 34 by means of slide 36 and pipe 35. Consequently, pipes 38 and 39 are connected with each other, the former being in connection with drain 40b of slide valve 40. Pipe 37 connected with pipe 24 via slide valve 40 is prevented from communicating with pipe 39 by means of slide valve 33.

In order to put the press drive into operation slide valves 42 and 45 are simultaneously displaced to their upper end positions (see Figs. 2 and 3), whereby pipe 43 is connected to pipe 39 and the connection between pipe 24 and pipe 44 is interrupted. Pipe 44 will then be connected with drain 45b so that in the position of slide valves 36 and 40 shown in Fig. 4, the auxiliary piston 27 will be displaced to its upper end position by means of the working medium for the servo-piston 26; at the same time the primary unit 2 will be pivoted towards position P as previously described (Fig. 2). If, on the other hand, primary unit 2 is to be pivoted towards position H, the regulating member 34 must be associated with the corresponding pressure side, e.g., pipe 19 via slide valve 36, whereas the corresponding portion of the total range of adjustment will be associated by means of slide valve 40, thereby connecting the corresponding pipe 38 to pipe 24 (Fig. 3).

In Fig. 4a a slide valve 36' is shown which may be used to replace slide valve 36. Due to its configuration slide valve 36' is adapted to connect pipe 35 with that one of pipes 18 or 19, which corresponds to the desired pressure side so that this pressure side will automatically be associated with the regulating member 34. Slide valve 36' may be connected with slide valve 40 via mechanical or electrical means (not shown) in order to displace the latter simultaneously with the displacement of the slide valve 36'.

Figure 5:
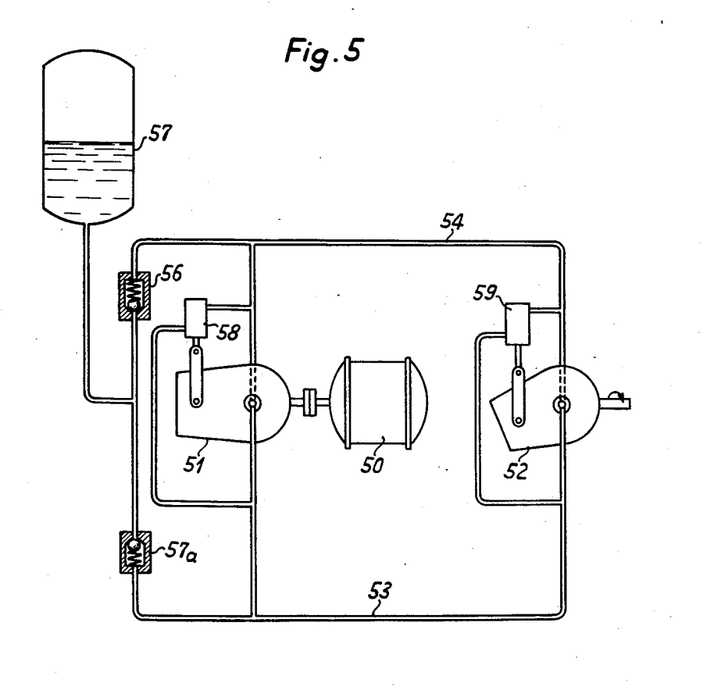
Fig. 5 is a diagrammatic view of a hydrostatic power transmission system for use in connection with a vehicle, which is equipped with a control device according to the present invention.

Fig. 5 illustrates schematically a hydrostatic transmission system suitable for an automotive vehicle, which consists of a primary unit 51 driven by an electric motor 50 and a secondary unit 52 connected to a drive axle (not shown). The pressure sides of the two units 51 and 52 are connected to each other via pipes 53 and 54. Both of the pipes 53 and 54 are in association with a reservoir 57 by means of one-way valves 56 and 57a, respectively. The reservoir 57 is adapted to feed additional quantities of a hydraulic medium, for instance, oil to the respective low pressure side of said primary unit 51 through the respective one-way valves 56, 57a in order to compensate for the losses of such oil. The two members 51 and 52 are influenced by control devices 58 and 59, respectively, which may operate to maintain constant power as described in connection with the control device 20 shown in Figs. 2 to 4. As will be well understood, a feed pump of constant or variable displacement in connection with an excess oil valve and a storage tank may be employed instead of reservoir 57.

It will be understood that whereas in the device disclosed in Fig. 1 it is only the displacement of the primary member or pump 2 which can be varied by means of the control device 20, the device shown in Fig. 5 permits also to vary the displacement of the secondary member or motor 52 by means of the control device 59.

As mentioned above, a system as the one disclosed in Fig. 5 may be used as power transmission for road or rail vehicle. In such application, the engine or motor 50 will drive the vehicle over the pump 51 and motor 52, the latter being operatively connected over its shaft with the wheels of the vehicle (not shown). In idling of the vehicle the pump 51 will have the position indicated in Fig. 5, namely, the neutral position in which the displacement thereof is 0. When the vehicle is to be put into motion, either forward or reverse, the pump will be moved out of its neutral position either manually or by an auxiliary servo-circuit such as the one shown in connection with the control device of Figs. 2–4. Pressure will then build up in one of lines 53 or 54 and the motor 52 will accordingly rotate its shaft at maximum torque, the motor taking up the position shown in Fig. 2, in which the capacity thereof is at its maximum. The pressure of the hydraulic medium in the line 53 or 54 will rise until pump 51 has reached its corresponding position, the vehicle having thus been put into motion at the position of maximum displacement of the pump 51. When maximum pressure has been reached, control of the circuit and of the transmission will be taken over by the control device 59 which will now operate, for instance, to maintain the pressure in the system constant while the transmitted torque may be reduced during a further increase in speed of the vehicle. The operation of a control device for constant pressure as at 59 in Fig. 5 is described in more detail in connection with Figs. 6 and 7.

Figure 6:
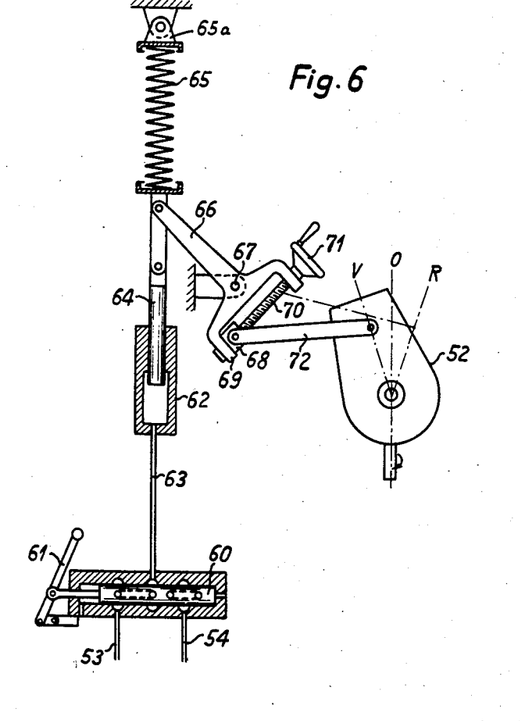
Fig. 6 is a diagrammatic view of a directly actuated hydraulic control device for a hydrostatic vehicle transmission shown in Fig. 5.

Fig. 6 shows a control device adapted for constant pressure regulation, in which the respective member to be regulated is directly influenced, i.e., without making use of an auxiliary control circuit or servo-motor. This control device is provided with a slide valve 60 adapted to be operated by means of a lever 61 in order to coordinate or associate with a regulating member 62 the desired pressure side, for instance, the high pressure side of the hydrostatic transmission system.

The regulating member 62 is connected with slide valve 60 by means of a pipe 63 and contains a piston 64 subjected to the action of a spring 65 rigidly supported and anchored at its upper end at 65a. A lever 66 is hingedly connected with piston 64 and pivoted at fulcrum 67. Lever 66 carries a fork 69 in which an adjusting spindle 70 is journaled. Spindle 70 which may be rotated by means of a hand wheel 71 carries a nut or follower 68 which, over a rod 72, is connected with the secondary member 52, also shown in Fig. 5.

In the position of Fig. 6, the secondary member 52 is in its condition of maximum displacement and is being held or maintained therein by the pressure of the hydraulic medium acting through pipe 53 on piston 64 of the regulating member 62 against the action of the spring 65.

Let it be assumed that pipe 53 connected via slide valve 60 with pipe 53 is in connection with the high pressure side. When the pressure in pipe 53 decreases, piston 64 is displaced downwardly by spring 65, thereby simultaneously pivoting lever 66 and secondary member 52 through connecting rod 72 towards its 0-position. Since the pivoting movement of secondary member 52 is directed toward its 0-position, the fluid absorbing or suction capacity of this secondary member is decreased, thus increasing the pressure in pipe 53.

When the pressure increases, secondary member 52 is again displaced towards position V, so that its absorption capacity increases and the pressure is decreased. In the position of nut 68 indicated in Fig. 6 the section 0 to V of the regulating range of the secondary member 52 is coordinated to the regulating member 62. By means of hand wheel 71 nut 68 may be moved into its other extreme position in which section 0 to R will be coordinated to the regulating member 62. The mode of operation of the control device is the same in this section of the regulating range as described in connection with portion 0 to V.

Since the full operating pressure acts upon piston 64, spring 65 must be constructed to be rather forceful in actual practice. It is therefore advisable to provide for an indirect actuation of the secondary member by means of a servo-motor, and to use the regulating member solely for control purposes. A control device for constant pressure of this type is shown in Fig. 7, certain parts thereof corresponding to those shown in Fig. 6.

As will be seen from Fig. 7, slide valve 60 is again connected with pipes 53 and 54 in order to coordinate one or the other of the pressure sides of the secondary member to regulating member 75. Regulating member 75 comprises a servo-piston 76 and a slide valve 77 displaceable with respect to servo-piston 76. Slide valve 77 is subjected, on the one hand to the action of a spring 78 and, on the other hand, to the pressure of the associated pressure side acting in opposite direction with respect to the spring 78. As will be seen from Fig. 7, slide valve 77 controls a number of connecting channels within servo-piston 76 whereby it is possible to subject the upper or lower side of servo-piston to pressure increases or decreases and to thereby displace the piston accordingly. This displacement of the piston is transmitted to a connecting rod 79 and then to a lever 80 pivotally supported at 81, which lever carries a piston 82. The two respective ends of piston 82 are guided in cylinders 83 and 84, whereas its central portion is connected to a rod 84b supported by the secondary member 52. Thus, the latter may be pivoted in accordance with the displacement of the servo-piston 76. The piston 82 may be displaced between two end positions by means of oil under pressure, which may be supplied from one or the other pressure sides through conduits 83a, 84a by means of selectively or automatically actuated valves, in order to associate one or the other portion of the regulating range of the secondary member 52 with the regulating member 75.

Figure 7:
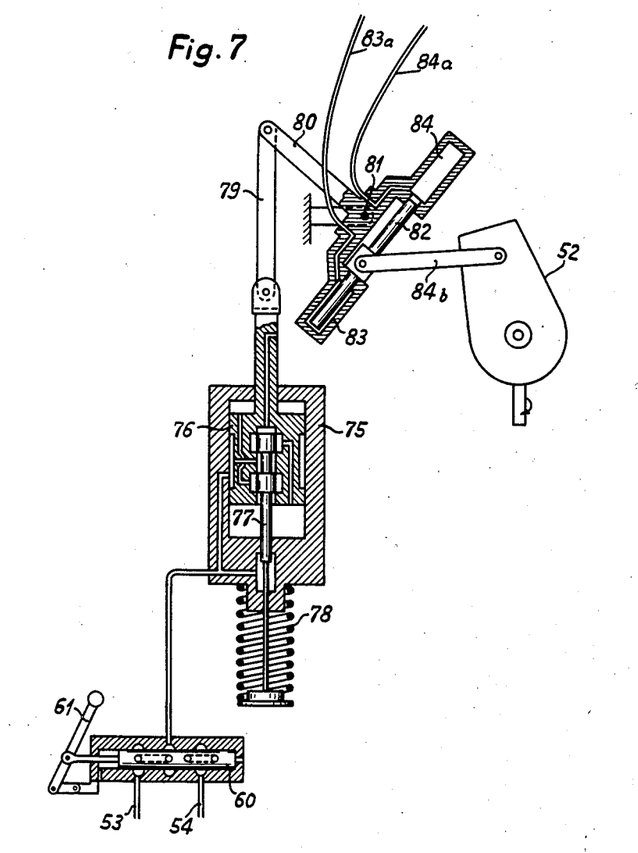
Fig. 7 is a diagrammatic view of an indirectly actuated pilot operated control device for the hydrostatic vehicle transmission shown in Fig. 5.

Control devices of the type shown in Figs. 6 and 7 may naturally be also employed in connection with different types of power transmissions, for instance, power transmissions of the kind shown in Fig. 1. Naturally, also the primary unit or member may be regulated to maintain constant pressure. Furthermore, it is possible to use control devices of the type described also with power regulating means by subjecting the spring acting upon the regulating valve to a bias varying in accordance with the pivoting angle of the member to be regulated, for instance, as shown in the control device of Figs. 2 to 4. Alternatively, it is also possible to subject the regulating member or valve, i.e., its spring additionally to a force varying in accordance with the torque, for instance, the torque of a drive motor. An arrangement of this type will be especially suitable if the drive motor is constituted by an internal combustion engine. The biasing action of the spring may also be adjusted in accordance with the position of the gas pedal or lever, i.e., in accordance with the feed of the injection pump. Moreover, it is possible to effectuate pivoting movement of the primary and secondary units or members by mechanical or electrical members, instead of making use of fluid-actuated or hydraulic devices.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A power transmission system comprising drive means capable of assuming a plurality of positions corresponding to the pressure to be transmitted by said drive means, an operable element operatively connected to said drive means, control means connected to said drive means for positioning said drive means relative to an inoperative position to thereby determine the pressure to be transmitted to said operable element, means operatively related to said control means holding a working fluid medium so that said control means may be influenced by said working fluid medium in accordance with the pressure to be delivered by said drive means to said operable element and so that said drive means will assume a predetermined position in order to maintain the product of said pressure and the position of said drive means relative to said inoperative position constant, said predetermined position of said drive means being determined by said control means.

2. In a hydrostatic power transmission system including first and second hydraulic displacement-type members, at least one of said first and second members being adjustable with respect to displacement in a first range corresponding to one transmission direction and in a second range corresponding to an opposite transmission direction, first and second conduit means interconnecting said first and second members and forming a hydraulic circuit holding hydraulic medium; control means comprising a single pressure responsive member operatively connected with said adjustable member to effect adjustment thereof in said first and second range, respectively, first operable means for selectively and alternatively connecting said pressure responsive member with said first conduit means and with said second conduit means, respectively, to subject said pressure responsive member to the pressure of said hydraulic medium in said respective conduit means, and second operable means connected with said adjustable member for selectively transferring said adjustable member between said first range and said second range, whereby in each of said ranges said adjustable member may automatically be adjusted in dependency of the pressure of said hydraulic medium in said first and second conduit means, respectively, to thereby influence said pressure by adjustment of the displacement of said adjustable member.

3. In a control system, for a reversible hydraulic displacement-type member, variable with respect to displacement in a first range corresponding to one transmission direction of displacement and in a second range corresponding to an opposite transmission direction of displacement, respectively, of a hydraulic working medium and having two ports for said hydraulic medium; control means comprising a single pressure responsive member operatively connected with said variable member to effect variation of the displacement thereof in said first and second range, respectively, first operable means for selectively connecting said pressure responsive member with one of said ports and with the other of said ports, respectively, to subject said pressure responsive member to the pressure of said hydraulic medium at said ports, and second operable means connected with said variable member for selectively reversing said variable member between said first range and said second range, whereby in each of said ranges the displacement of said variable member may automatically be varied in dependency of the pressure of said hydraulic medium at the selected one of said ports, to thereby influence said pressure by variation of the displacement of said variable member.

4. A power transmission system comprising pivotable primary means forming drive means and capable of assuming a plurality of angular positions relative to an inoperative position and corresponding to the pressure to to be transmitted by said drive means, an operable element operatively connected to said drive means, control means connected to said drive means for determining the angular position of said drive means relative to said inoperative position to thereby define the pressure to be transmitted to said operable element, auxiliary means operatively related to said control means and holding a working fluid medium so that said control means may be influenced by said working fluid medium in accordance with the pressure to be delivered by said drive means to said operable element and so that said drive means will assume a predetermined angular position in order to maintain the product of said pressure and the angle formed due to pivotal movement of said drive means relative to said inoperative position constant, said control means including a servo-motor operatively connected to said drive means, said servo-motor having cylinder and piston means arranged for displacement in said cylinder, said cylinder having port means, said auxiliary means being adapted to supply said working fluid medium to said servo-motor through a predetermined port means, to thereby displace said piston means and through the latter said drive means to determine the angular position thereof.

5. A system according to claim 4, including slide means connected to said drive means, said control means further including regulatable valve means, and biasing means operatively connecting said slide means to said regulatable valve means.

6. A system according to claim 4, including cam means connected with said slide for movement therewith, said biasing means being displaceable by said cam means for actuating said regulatable valve means to bring about state of equilibrium, so that said product of pressure and the angle formed due to pivotal movement of said drive means relative to said inoperative position remains constant.

7. A power transmission system comprising pivotable primary means forming drive means and capable of assuming a plurality of angular positions relative to an inoperative position and corresponding to the pressure to be transmitted by said drive means, an operable element operatively connected to said drive means, control means for determining the angular position of said drive means relative to said inoperative position to thereby define the pressure to be transmitted to said operable element, a reservoir operatively related to said control means for holding and releasing a working fluid medium so that said control means may be influenced by said working fluid medium in accordance with the pressure to be delivered by said drive means to said operable element and so that said drive means will assume a predetermined angular position, in order to maintain the product of said pressure and the angle formed due to pivotal movement of said drive means relative to said inoperative position constant, said control means being connected to said drive means, said reservoir supplying said working fluid medium to said control means, and valve means between said reservoir and said drive means to afford passage of said working fluid medium from said reservoir to said drive means.

8. A system according to claim 7, said operable element forming pivotable secondary means, and further control means operatively connected to said secondary means.

9. A system according to claim 1, said control means including servo-motor means, first means operatively connecting said drive means with said servo-motor means, and regulating means actuatable via said operable element and responsive to the change of load on the latter, to thereby influence the position of said drive means through operation of said servo-motor means.

References Cited in the file of this patent

UNITED STATES PATENTS

| | | |
|---|---|---|
| 1,854,226 | Rouse | Apr. 19, 1932 |
| 2,298,359 | Ernst et al. | Oct. 13, 1942 |
| 2,443,345 | Ernst | June 15, 1948 |